J. J. SIMMONS.
SWINGLETREE ATTACHMENT.
APPLICATION FILED SEPT. 1, 1914.
1,168,120.
Patented Jan. 11, 1916.
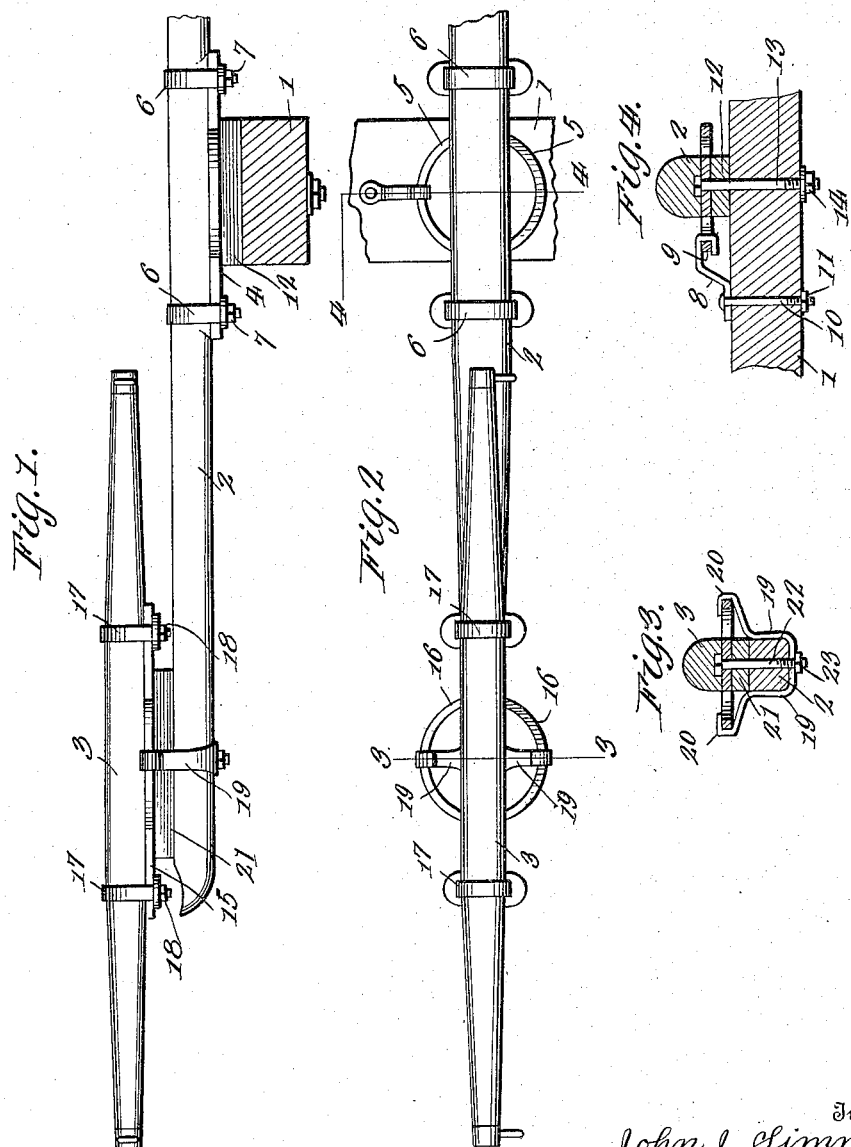
Witnesses
Guy M. Spring
J. P. Campbell
Inventor
John J. Simmons.
By Richard B. Owen
Attorney

UNITED STATES PATENT OFFICE.

JOHN J. SIMMONS, OF DUNNEGAN, MISSOURI.

SWINGLETREE ATTACHMENT.

1,168,120.      Specification of Letters Patent.      Patented Jan. 11, 1916.

Application filed September 1, 1914. Serial No. 859,666.

*To all whom it may concern:*

Be it known that I, JOHN J. SIMMONS, a citizen of the United States, residing at Dunnegan, in the county of Polk and State of Missouri, have invented certain new and useful Improvements in Swingletree Attachments, of which the following is a specification.

My invention relates to new and useful improvements in swingletree attachments, and has for its primary object the provision of a device of this character for limiting the pivotal movement of the swingletree.

A further object is the provision of a device for attaching the swingletree to a doubletree.

With these and other objects in view the invention consists in the novel details of construction and arrangement of parts which will be more clearly understood from the following description and drawings, in which, Figure 1 is a side view. Fig. 2 is a plan view. Fig. 3 is a transverse section on the line 3—3 of Fig. 2, and Fig. 4 is a transverse section on the line 4—4 of Fig. 2.

In the drawings the numeral 1 indicates the tongue of a vehicle of ordinary construction, 2 indicates one end of a doubletree, and 3 indicates a swingletree. Secured to the underside of the doubletree is a plate 4 having the semi-circular extensions 5 on each side thereof. The plate 4 is secured to the doubletree by means of the bails 6 and nuts 7. An arm 8 having the hooked end 9 is secured to the tongue by means of the bolt 10 and nut 11 and the hooked end 9 of the arm 8 encircles one of the semi-circular extensions 5 of the plate, as clearly shown in Fig. 4 of the drawings. A spacing block 12 is placed between the doubletree and tongue and a bolt 13 passes through the plate 4, the spacing block 12 and the tongue 1 and receives the nut 14 on the threaded end thereof.

Secured to the underside of the swingletree 3 is a plate 15 having the semi-circular extensions 16 on each side thereof and the said plate 15 is secured to the swingletree by means of the bails 17 and nuts 18. An inverted U-shaped member forming the two arms 19 extends under the doubletree and is provided with the hooked ends 20 which underlie and overlap the semi-circular extensions 16 on the plate 15. It will be noted by more particularly referring to Fig. 3 of the drawings that the hooked ends 20 of the arms 19 form a support for the underside of the semi-circular extensions as well as overlap the upper surface of the extensions. A spacing block 21 is placed between the plate 15 and the upper surface of the doubletree and a bolt 22 passes through the plate 15, the spacing block 21, the doubletree, and the connecting bar of the inverted U-shaped arm member and a nut 23 is received on the threaded end of the bolt.

It will be noted that in constructing the device, as described, it may be easily attached to either a swingletree or a doubletree and that it is not necessary to have the pivotal bolts extend entirely through the swingletree or doubletree. It will also be noted that in using a device of this character the pivotal movement of both the doubletree and the swingletree is limited and that there can be no vertical movement which would lead to binding. In both that form of the invention used with the swingletree and doubletree the arm members extend both beneath and over the semi-circular extensions, thereby forming a support therefor as well as preventing any upward movement.

Having fully described my invention what I claim as new and desire to secure by Letters Patent is:—

1. The combination of a doubletree having a U-shaped member secured thereto, a portion of the arms of the said member snugly engaging the doubletree, the terminals of said arms bent to form channelways, a swingletree having a plate secured thereto and received within said channelways, and a bolt pivotally connecting the doubletree and swingletree.

2. The combination of a doubletree having a U-shaped member snugly engaged therewith, the terminals of said member bent to form channelways, a swingletree having a plate secured thereto, laterally extending ears on the plate alined with the swingletree, semicircular extensions on the plate adapted to be received in the channelways, means for securing the plate to the swingletree, and a bolt pivotally connecting the doubletree and swingletree.

In testimony whereof I affix my signature in presence of two witnesses.

JOHN J. SIMMONS.

Witnesses:
B. H. EMERSON,
T. A. HENDRICKS.

Copies of this patent may be obtained for five cents each, by addressing the "Commissioner of Patents, Washington, D. C."